United States Patent
Byun et al.

(10) Patent No.: US 8,744,430 B2
(45) Date of Patent: Jun. 3, 2014

(54) APPARATUS AND METHOD FOR ELIMINATING AN INTERFERENCE SIGNAL IN A COMMUNICATION SYSTEM

(75) Inventors: Myung-Kwang Byun, Suwon-si (KR); Jeong-Tae Oh, Yongin-si (KR); Jae-Ho Jeon, Seongnam-si (KR); Sung-Kwon Jo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 688 days.

(21) Appl. No.: 12/380,903

(22) Filed: Mar. 5, 2009

(65) Prior Publication Data

US 2009/0227247 A1 Sep. 10, 2009

(30) Foreign Application Priority Data

Mar. 5, 2008 (KR) .......................... 10-2008-0020749

(51) Int. Cl.
*H04M 1/725* (2006.01)

(52) U.S. Cl.
USPC .......................................... 455/423; 370/252

(58) Field of Classification Search
CPC ........................ H04W 28/0236; H04W 28/048
USPC ................. 455/423–424, 114.2; 375/E1.029; 370/335, 252
See application file for complete search history.

(56) References Cited

U.S. PATENT DOCUMENTS

| | | | |
|---|---|---|---|
| 2003/0003906 A1* | 1/2003 | Demers et al. ................ | 455/424 |
| 2003/0003937 A1* | 1/2003 | Ohkubo et al. ................ | 455/517 |
| 2003/0174675 A1* | 9/2003 | Willenegger et al. ......... | 370/335 |
| 2004/0235419 A1* | 11/2004 | Michel ........................... | 455/12.1 |
| 2005/0181814 A1* | 8/2005 | Okamoto et al. .............. | 455/517 |
| 2006/0077300 A1* | 4/2006 | Cheon et al. ................... | 348/614 |
| 2006/0141933 A1* | 6/2006 | Smee et al. .................... | 455/63.1 |
| 2006/0198362 A1* | 9/2006 | Molev-Shteiman et al. . | 370/352 |
| 2006/0240794 A1* | 10/2006 | Cozzo et al. ................... | 455/295 |
| 2007/0040704 A1* | 2/2007 | Smee et al. .................... | 340/981 |
| 2007/0093261 A1* | 4/2007 | Hou et al. ...................... | 455/506 |
| 2007/0104253 A1* | 5/2007 | Luo et al. ...................... | 375/148 |
| 2007/0121554 A1* | 5/2007 | Luo et al. ...................... | 370/335 |
| 2007/0140321 A1* | 6/2007 | Yousef et al. .................. | 375/148 |
| 2008/0123611 A1* | 5/2008 | Wang et al. .................... | 370/342 |
| 2009/0046694 A1* | 2/2009 | Matsumoto et al. ........... | 370/343 |
| 2009/0097532 A1* | 4/2009 | Molev-Shteiman et al. . | 375/144 |
| 2009/0110128 A1* | 4/2009 | Yu et al. ......................... | 375/354 |
| 2010/0316154 A1* | 12/2010 | Park et al. ...................... | 375/267 |

* cited by examiner

*Primary Examiner* — Nathan Taylor

(57) ABSTRACT

An apparatus and method for eliminating interference in a base station (BS) of a communication system. A first BS receives a first reception signal from a first mobile station located in a cell of the first base station. A second base station being adjacent to the first base station delivers decoding information of a second reception signal to the first base station, the second reception signal received from a second mobile station located in a cell of the second base station. The first BS determines whether an error exists on the second reception signal, based on the decoding information and re-generates an interference signal using the decoding information of the second reception signal when no error exists in the second reception signal, and performing interference elimination on the first reception signal using the re-generated interference signal.

20 Claims, 5 Drawing Sheets

APPARATUS AND METHOD FOR ELIMINATING AN INTERFERENCE SIGNAL IN A COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Mar. 5, 2008 and assigned Serial No. 10-2008-0020749, the disclosures of which are incorporated herein by reference.

TECHNICAL FIELD OF THE INVENTION

The present invention relates generally to an apparatus and method for eliminating an interference signal in a communication system, and more particularly, to an apparatus and method for eliminating an interference signal of an adjacent cell or sector in a communication system.

BACKGROUND OF THE INVENTION

In general, Inter-Cell Interference (ICI) may occur when a limited resource, such as a frequency resource, a code resource, a timeslot resource, or etc., is divided and used for a plurality of cells in a communication system having a cellular structure (hereinafter, referred to as "cellular communication system").

When the frequency resource is divided and used for the plurality of cells in the cellular communication system, performance is degraded due to the ICI. Here, a scheme wherein the frequency resource is divided and used for the plurality of cells is referred to as a frequency resource reuse scheme. To increase the total capacity, the cellular communication system uses the frequency resource reuse scheme. Here, the rate at which the same frequency resource is reused is referred to as a "frequency reuse factor." The frequency reuse factor is determined by the number of cells without use of the same frequency resource. For example, when the frequency reuse factor is 1/K, the number of cells without use of the same frequency resource is K.

When the frequency reuse factor is small, that is, when the frequency reuse factor is less than 1, the ICI decreases. However, as an available frequency resource amount in one cell decreases, the total capacity of the cellular communication system decreases. Conversely, when the frequency reuse factor is 1, that is, when all cells configuring the cellular communication system use the same frequency resource, the ICI increases. However, as an available frequency resource amount in one cell increases, the total capacity of the cellular communication system increases.

On the other hand, a next-generation communication system is developing into the form of providing a service of transmitting and receiving large-capacity data to and from a Mobile Station (MS) at high speed. A representative example of the next-generation communication system is an Institute of Electrical and Electronics Engineers (IEEE) 802.16e communication system. The IEEE 802.16e communication system is a representative communication system using an orthogonal frequency division multiplexing (OFDM) scheme and an orthogonal frequency division multiple access (OFDMA) scheme. Now, the case where the ICI occurs in the IEEE 802.16e communication system will be described with reference to FIG. 1.

FIG. 1 is a schematic view illustrating a structure of a conventional communication system in which an interference signal occurs.

Referring to FIG. 1, the communication system includes a first cell 110, a second cell 120, a third cell 130, a first Base Station (BS) 111 for managing the first cell 110, a second BS 121 for managing the second cell 120, a third BS 131 for managing the third cell 130, a first MS 113 for receiving a service from the first BS 111, a second MS 123 for receiving a service from the second BS 121, and a third MS 133 for receiving a service from the third BS 131. The first BS 111, the second BS 121, and the third BS 131 provide the services using the same frequency resource. Since the services are provided using the same frequency resource, the ICI occurs, resulting in the fatal degradation of uplink and downlink performance.

For example, when a first signal 115 is transmitted from the first MS 113 to the first BS 111, a second signal 117 transmitted from the second MS 123 and a third signal 119 transmitted from the third MS 133 become interference signals to the first signal 115. Since the second signal 117 and the third signal 119 are interference signals that are received along with the first signal 115, the uplink performance of the first BS 111 is degraded.

Therefore, an interference signal elimination technology is needed to prevent the degradation of uplink and downlink performance.

SUMMARY OF THE INVENTION

To address the above-discussed deficiencies of the prior art, it is a primary object of the present invention to address at least the problems and/or disadvantages and to provide at least the advantages described below. Accordingly, an aspect of the present invention is to provide an apparatus and method for eliminating an interference signal of an adjacent cell or sector that can prevent the degradation of uplink and downlink performance in a communication system.

According to an aspect of the present invention, there is provided a method for eliminating interference in a base station of a communication system, including: receiving, by a first base station, a first reception signal from a first mobile station located in a cell of the first base station; transmitting, by a second base station being adjacent to the first base station, decoding information of a second reception signal received from a second mobile station located in a cell of the second base station, to the first base station; determining by the first base station whether an error exists in the second reception signal, based on the decoding information; and re-generating an interference signal using the decoding information of the second reception signal when no error exists in the second reception signal, and performing interference elimination on the first reception signal using the re-generated interference signal.

According to an aspect of the present invention, there is provided a base station including: an interference eliminator for eliminating interference in a communication system, a receiving module for receiving a first reception signal from a first mobile station located in a cell of a first base station, and receiving, from a second base station, decoding information of a second reception signal that the second base station being adjacent to the first base station has received from a second mobile station located in a cell of the second base station; and an interference eliminating unit for determining whether an error exists in the second reception signal, based on the decoding information, re-generating an interference signal using the decoding information of the second reception signal when no error exists in the second reception signal, and performing interference elimination on the first reception signal using the re-generated interference signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same it should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention will now be described in detail with reference to the annexed drawings. In the following description, a detailed description of known functions and configurations incorporated herein has been omitted for clarity and conciseness.

The present invention proposes an apparatus and method for eliminating an interference signal affected by a mobile station in an adjacent cell in a communication system. Hereinafter, for convenience of description, the communication system is assumed as an IEEE 802.16e communication system. However, the invention is applicable to other communication systems as well as the above-described IEEE 802.16e communication system.

One BS can manage one cell or a plurality of cells. However, in the following description, a cell and a BS can be used in the same concept by assuming that one BS manages only one cell. The cell can be used in the same concept as one of a cell to be managed by the BS, a sector, a micro-cell, and a pico-cell. In the description of the invention, the case where interference of an adjacent cell is considered will be described. However, the invention can consider interference between adjacent sectors in the same cell as well as the interference of the adjacent cell. Only for convenience of description, the case where only the interference of the adjacent cell is considered will be described as one example.

In the following description, a reception signal including one burst will be considered for convenience purpose only. However, a reception signal including two or more bursts can also be considered. Thus, the number of bursts in the reception signal shall not limit the scope of the invention.

Figure 1:
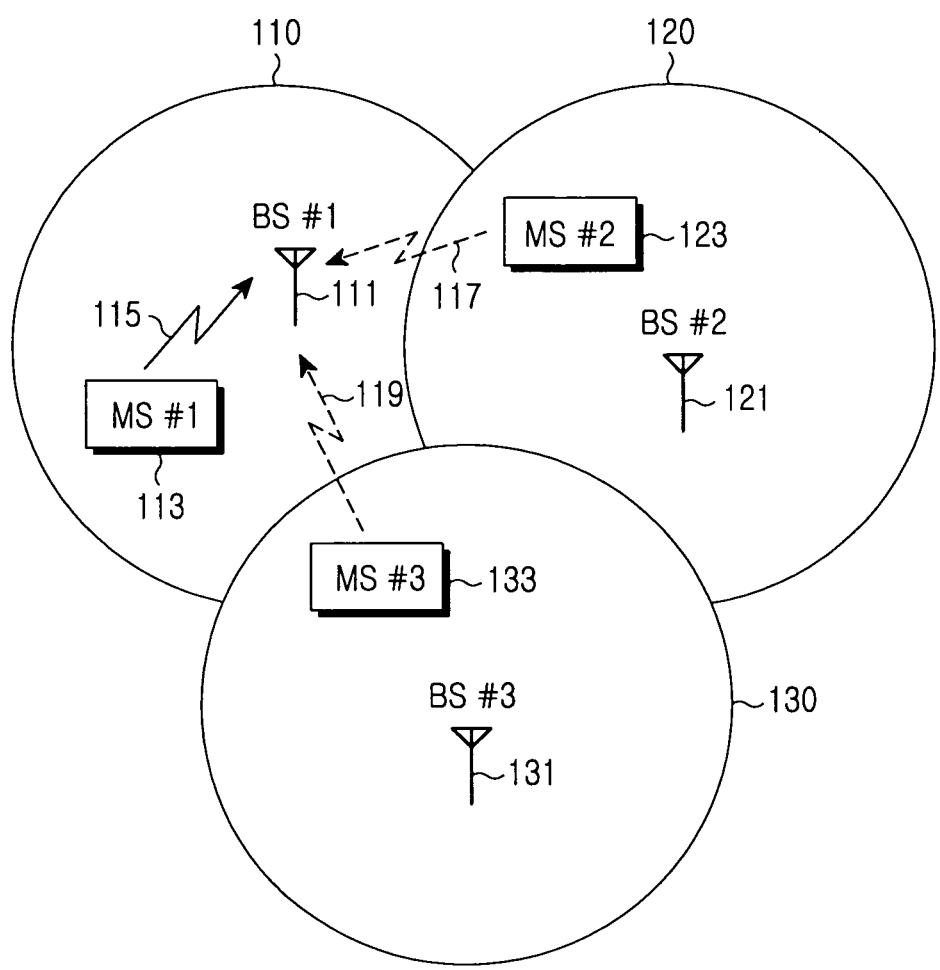
FIG. 1 is a schematic view illustrating a structure of a conventional communication system in which an interference signal occurs.
Figure 2:
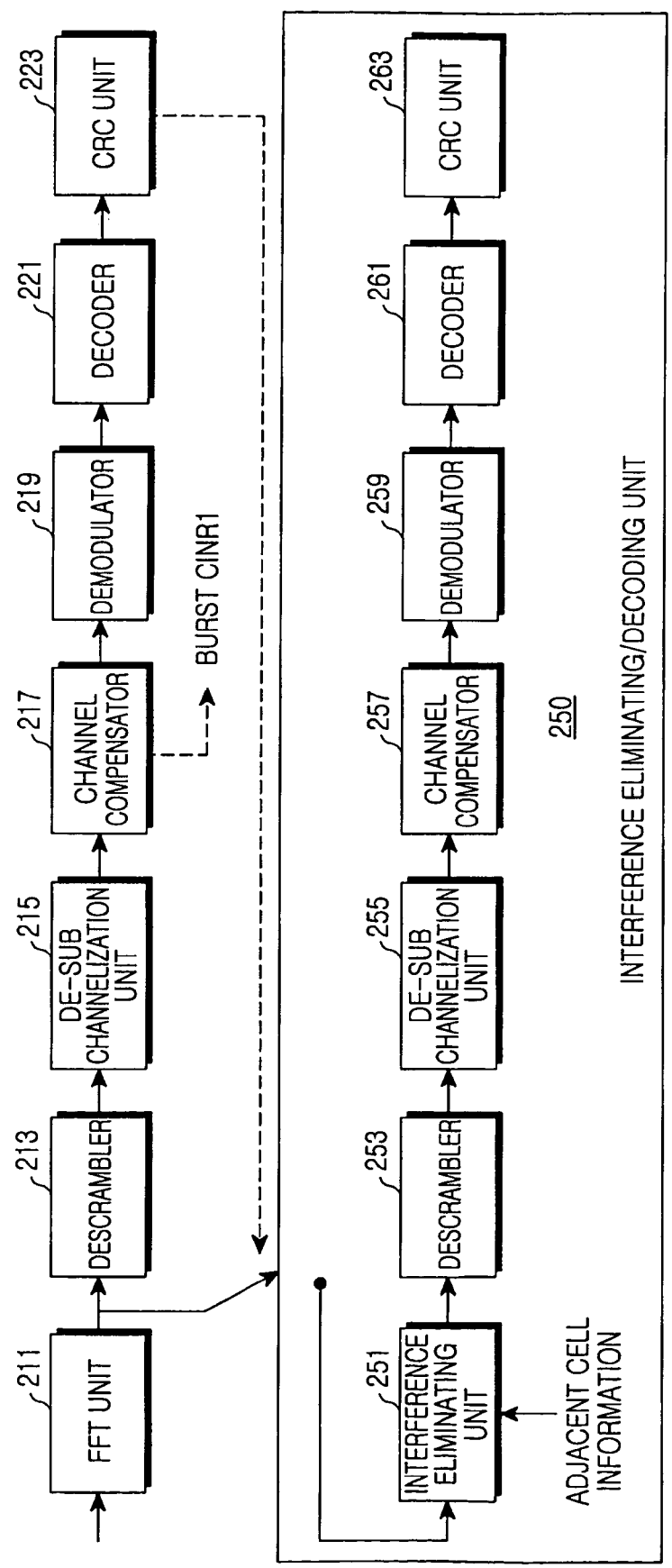
FIG. 2 illustrates an internal structure of a signal receiver for eliminating an interference signal in a communication system according to an exemplary embodiment of the present invention.

FIG. 2 illustrates an internal structure of a signal receiver for eliminating an interference signal in an IEEE 802.16e communication system according to an exemplary embodiment of the present invention.

In FIG. 2, the signal receiver can be provided in at least one of a BS and an MS. Here, it is assumed that the signal receiver is provided in the BS as one example.

Referring to FIG. 2, the signal receiver includes a Fast Fourier Transform (FFT) unit 211, a descrambler 213, a de-subchannelization unit 215, a channel compensator 217, a demodulator 219, a decoder 221, a Cyclic Redundancy Check (CRC) unit 223, and an interference eliminating/decoding unit 250. The interference eliminating/decoding unit 250 includes an interference eliminating unit 251, a descrambler 253, a de-subchannelization unit 255, a channel compensator 257, a demodulator 259, a decoder 261, and a CRC unit 263.

Referring to the constituent elements, the FFT unit 211 receives a reception signal from an outside source, performs an N-point FFT operation on the reception signal, and outputs the FFT reception signal to the descrambler 213. The FFT unit 211 operates the interference eliminating/decoding unit 250 by outputting the FFT reception signal to the interference eliminating/decoding unit 250 according to a preset scheme. The preset scheme will be described concretely and hence its description is omitted here.

The descrambler 213 descrambles the signal input from the FFT unit 211 according to a descrambling scheme corresponding to a scrambling scheme used in a signal transmitter and then outputs the descrambled signal to the de-subchannelization unit 215.

The de-subchannelization unit 215 detects and aligns data subcarriers including the signal input from the descrambler 213, for example, an actual data signal from a burst, and pilot subcarriers including a reference signal, e.g., a pilot signal, detects the data signal from the aligned data subcarriers and the pilot signal from the aligned pilot subcarriers, and outputs the detected signals to the channel compensator 217.

The channel compensator 217 estimates a channel and noise using the pilot signal input from the de-subchannelization unit 215, channel-compensates the data signal using the estimated channel and noise, and outputs the channel-compensated data signal to the demodulator 219. The channel compensator 217 generates a burst Carrier to Interference and Noise Ratio (CINR) using power of the channel-compensated data signal and power of the estimated noise. Here, the burst CINR is used for scheduling and power control and referred to as "burst CINR1."

The demodulator 219 demodulates the signal input from the channel compensator 217 according to a demodulation scheme corresponding to a modulation scheme used in the signal transmitter and then outputs the demodulated signal to the decoder 221.

The decoder 221 decodes the demodulated signal input from the demodulator 219 according to a decoding scheme corresponding to an encoding scheme used in the signal transmitter and then output the decoded signal to the CRC unit 223.

The CRC unit 223 performs a CRC operation on each burst of the decoded signal output from the decoder 221 and determines whether an error has occurred in the decoded signal. When no error has occurred in the decoded signal, the decoded signal output from the decoder 221 becomes a target detection signal.

Conversely, the operation of the interference eliminating/decoding unit 250 is determined according to the preset scheme, wherein the preset scheme is as follows.

A first scheme is the scheme wherein the interference eliminating/decoding unit 250 operates only when the error has occurred in the decoded signal as the CRC result by the CRC unit 223.

A second scheme is the scheme wherein the interference eliminating/decoding unit 250 operates regardless of whether the error has occurred in the decoded signal. Describing in more detail, the interference eliminating/decoding unit 250 performs an interference eliminating/decoding operation when the error has occurred in the decoded signal, and the interference eliminating/decoding unit 250 generates only a burst CINR without performing the interference eliminating/decoding operation when no error has not occurred in the decoded signal. Here, for convenience of description, the burst CINR generated by the interference eliminating/decoding unit 250 is referred to as "burst CINR2." An application of the first and second schemes is controlled by a controller (not illustrated) of the signal receiver.

The first scheme can decrease a load of the signal receiver since the interference eliminating/decoding unit 250 operates only when the error has occurred in the decoded signal according to the CRC result.

The second scheme increases a load of the signal receiver since the interference eliminating/decoding unit 250 operates regardless of whether the error has occurred in the decoded signal. However, since the burst CINR2 is generated even when no error has occurred in the decoded signal, system performance can be improved using the burst CINR2 in terms of scheduling and power control.

Since the operations of the remaining elements, except the interference eliminating unit 251 among the elements included in the interference eliminating/decoding unit 250, that is, the descrambler 253, the de-subchannelization unit 255, the channel compensator 257, the demodulator 259, the decoder 261, and the CRC unit 263, are substantially the same as those of the descrambler 213, the detail descriptions of the de-subchannelization unit 215, the channel compensator 217, the demodulator 219, the decoder 221, and the CRC unit 223, are omitted here.

In the present invention, a BS improves the performance of interference signal elimination using a CRC result of an interference signal delivered from an adjacent BS.

A serving BS, i.e. a base station of a current cell is equipped with a signal receiver according to the present invention and receives adjacent cell information from an adjacent BS. The adjacent BS that manages each adjacent cell decodes a reception signal from an MS located in the adjacent cell, and delivers the adjacent cell information, including decoding information of the decoded signal (for example, a CRC result of the decoded signal) to the serving BS. Since the signal transmitted from the MS in the adjacent cell to the adjacent BS acts as an interference signal from a viewpoint of the serving BS.

At this time, the adjacent BS may transmit the adjacent cell information excluding or including the CRC result of the decoded signal. The serving BS receives the decoded signal from the adjacent BS, and directly performs CRC on the decoded signal when the adjacent cell information excludes the CRC result. The adjacent cell information further includes burst allocation information and pilot pattern information of the adjacent cell, will be used that the serving BS estimates a channel and/or power of interference signal caused by the MS located in the adjacent cell and regenerates the interference signal.

When no error has occurred in a interference signal based on the CRC result for the interference signal delivered from the adjacent BS, the BS eliminates interference from a desired reception signal received from a MS located in the current cell to the BS, by using an interference signal. If no error has occurred in the interference signal, it means that the interference signal is reliable.

Otherwise, when an error has occurred in the corresponding interference signal based on the CRC result for the interference signal, the BS decides whether an interference elimination condition is satisfied. If the error has occurred in the interference signal, it means that the interference signal is not reliable. An operation for deciding whether the interference elimination condition is satisfied can be performed in a controller (not illustrated) or another component within the signal receiver.

For example, decision of the interference elimination condition is performed for each burst, and can use power of a interference signal, a Modulation and Coding Scheme (MCS) level of the interference signal, the number of slots occupied by the interference signal, power of a background noise (for example, a thermal noise and a non-dominant interference), power of a desired reception signal (including a data burst to be received), an MCS level of the desired reception signal, the number of slots occupied by the desired reception signal, etc.

For example, the interference elimination condition can be set such that a power of an interference signal is enough larger than sum of a power of a background noise and a power of a desired reception signal. The interference elimination condition can be expressed as shown in Equation 1:

$$\frac{I_K}{N_0 + S} > \gamma \qquad \text{[Eqn. 1]}$$

In Equation 1, $I_K$ denotes power of a interference signal, $N_0$ denotes power of a background noise, S denotes power of a desired reception signal, and $\gamma$ denotes a threshold value. Further, $\gamma$ is determined by an MCS level for the interference signal, the number of slots occupied by the interference signal, etc. The desired reception signal is a signal that a serving BS receives from an MS located in its own cell and the interference signal is a signal that the serving BS directly receives from an MS located in an adjacent cell.

To decide the interference elimination condition, the serving BS acquires power of the interference signal received from the MS located in the adjacent cell using burst allocation information and pilot pattern information of the adjacent cell, included in adjacent cell information. For example, the serving BS measures power of pilot tones directly received from the MS located in the adjacent cell according to the pilot pattern information of the adjacent cell, and determines the measured power as the interference signal power $I_K$.

When a value computed by dividing the interference signal power by a sum of the background noise power and the reception signal power exceeds the threshold value, the BS determines that the interference elimination condition is satisfied. That is, when value of the interference signal power is enough larger than that of the reception signal power, the BS determines that the interference elimination condition is satisfied.

When the interference elimination condition is satisfied, the BS directly receives a signal from the MS located in the adjacent cell, receiving through a radio not receiving through the adjacent BS, regenerates a interference signal using the directly received signal, and performs interference elimination from the desired reception signal using the regenerated interference signal. Otherwise, when the interference elimination condition is not satisfied, the BS corrects the background noise power using the power of the interference signal and performs a demodulation and a decoding for the desired reception signal using the corrected background noise power. The desired reception signal means a signal received from the MS located in the current cell.

First, an operation wherein the BS directly receives a signal from a MS of a adjacent cell and eliminates interference from a desired reception signal using the received signal will be described.

Now, a structure of an interference signal receiver for directly receiving the signal from the MS of the adjacent cell will be described with reference to FIG. 3.

Figure 3:
FIG. 3 illustrates a structure of an interference signal receiver for directly receiving an interference signal according to an exemplary embodiment of the present invention.

FIG. 3 illustrates a structure of an interference signal receiver for directly receiving a signal from a MS located in a adjacent cell according to an exemplary embodiment of the present invention.

Referring to FIG. 3, the interference signal receiver includes an FFT unit 311, a descrambler 313, a de-subchannelization unit 315, a channel compensator 317, and a hard decider 319. In the interference signal receiver, the hard decider 319 can be replaced with a demodulator (not illustrated) and a decoder (not illustrated).

On the other hand, since the FFT unit 311, the descrambler 313, the de-subchannelization unit 315, the channel compensator 317, the demodulator (not illustrated), and the decoder (not illustrated) are substantially the same as those of the FFT unit 211, the descrambler 213, the de-subchannelization unit 215, the channel compensator 217, the demodulator 219, and the decoder 221, their detailed description is omitted here. Since the constituent elements of FIG. 3 are illustrated to describe an operation for directly receiving a signal from the MS of the adjacent cell, the BS can use only the constituent elements of FIG. 2 without the constituent elements of FIG. 3 for directly receiving the signal from the MS of the adjacent cell.

The interference signal receiver can directly receive a signal from the MS of the adjacent cell under control of a controller (not illustrated) within the interference signal receiver. Here, the received signal includes a interference signal.

The received signal is changed to a hard-decided interference signal through the FFT unit 311, the descrambler 313, the de-subchannelization unit 315, the channel compensator 317, and the hard decider 319. The hard decider 319 selects a signal point whose Euclidean distance with a signal output from the channel compensator 317 is shortest among signal points on a signal constellation. When the hard decider is used, the BS can reduce a processing time and complexity. When the demodulator (not illustrated) and the decoder (not illustrated) are used instead of the hard decider 319, interference can be detected accurately. According to a system situation or user setting, the hard decider 319 or the demodulator (not illustrated) and the decoder (not illustrated) may be used.

Thereafter, one of the decoded interference signal output from the decoder (not illustrated) and the hard-decided interference signal output from the hard decider 319 is provided to the interference eliminating unit 251 of FIG. 2.

Figure 4:
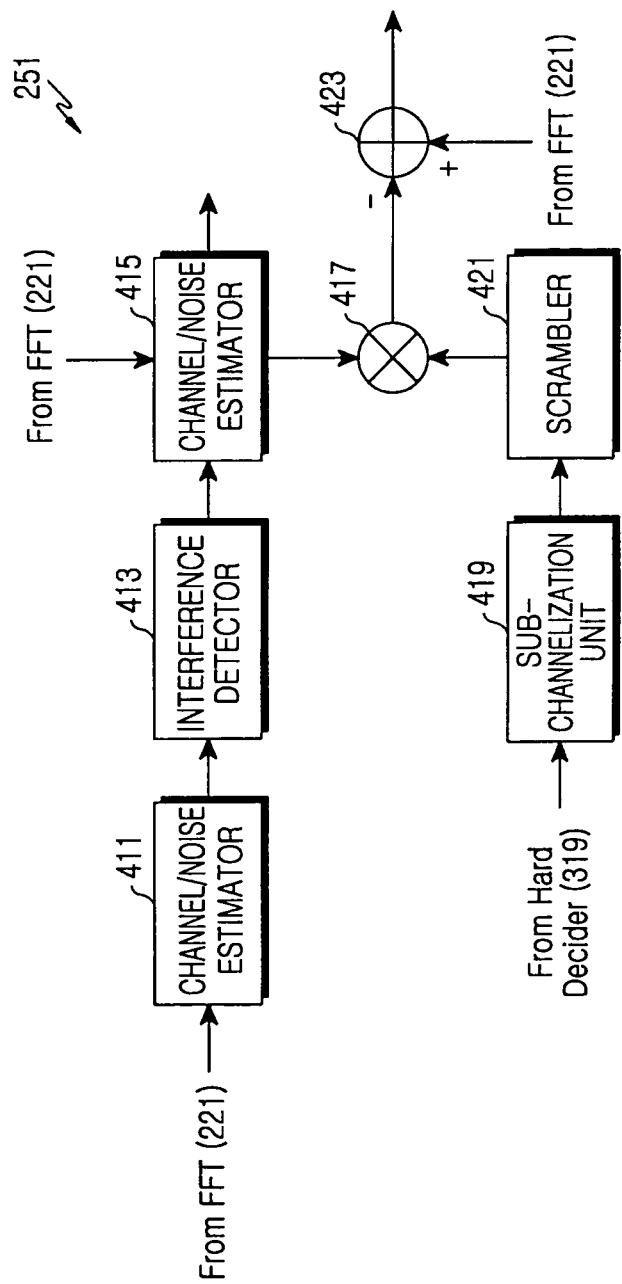
FIG. 4 illustrates an internal structure of an interference eliminating unit 251 of according to an exemplary embodiment of the present invention.

FIG. 4 illustrates an internal structure of the interference eliminating unit 251 of FIG. 2.

Referring to FIG. 4, the interference eliminating unit 251 includes a channel/noise estimator 411, an interference detector 413, a channel/noise estimator 415, a multiplier 417, a subchannelization unit 419, a scrambler 421, and a subtractor 423.

Referring to the constituent elements, the channel/noise estimator 411 estimates a channel, interference, and noise from an FFT reception signal output from the FFT unit 211 on the basis of information of an adjacent cell. The adjacent cell information includes burst allocation information and pilot pattern information of the adjacent cell. That is, the channel/noise estimator 411 detects a signal transmitted from a MS located in each adjacent cell on the basis of burst allocation information and pilot pattern information of all adjacent cells interfering with a current cell and estimates the channel, interference, and noise for the signal. Consequently, the channel/noise estimator 411 estimates channels from MSs to receive a service from the current cell and estimates channels from MSs to receive services from adjacent cells. The channel/noise estimator 411 estimates noise except ICI occurring in the current cell.

Then, the channel/noise estimator 411 outputs the estimated channel, interference, and noise to the interference detector 413. The interference detector 413 determines whether an MS to receive a service from the adjacent cell actually interferes with the current cell using the estimated channel, interference, and noise. When an interference amount of the MS to receive the service from the adjacent cell exceeds a product (T×Noise Amount) of a preset threshold value T and a noise amount, the interference detector 413 determines that the MS to receive the service from the adjacent cell interferes with the current cell. Otherwise, when the interference amount of the MS to receive the service from the adjacent cell is equal to or less than the product of the preset threshold value T and the noise amount, the interference detector 413 determines that the MS to receive the service from the adjacent cell does not interfere with the current cell.

Consequently, the interference detector 413 updates adjacent cell information including only information about adjacent cell and/or MSs interfering with the current cell and then outputs the updated adjacent cell information to the channel/noise estimator 415. The updated adjacent cell information is information in which information about the adjacent cells and/or the MSs that do interfere with the current cell is deleted from the original adjacent cell information.

The channel/noise estimator 415 estimates a channel, interference, and noise from an FFT reception signal output from the FFT unit 211 on the basis of the updated adjacent cell information and outputs the estimated channel, interference, and noise to the multiplier 417. On the other hand, the operation of the channel/noise estimator 415 is substantially the same as that of the channel/noise estimator 411. The only difference is that the channel/noise estimator 415 uses the updated adjacent cell information, not the adjacent cell information.

The subchannelization unit 419 receives the hard-decided interference signal from the hard decider 319 and subchannelizes the hard-decided interference signal according to the subchannelization scheme used in the signal transmitter and then outputs the subchannelized signal to the scrambler 421.

The scrambler 421 scrambles the signal output from the subchannelization unit 419 using the same scrambling scheme as the scrambling scheme used in the signal transmitter and then outputs the scrambled signal to the multiplier 417.

The multiplier 417 multiplies the signal output from the scrambler 421 by the signal output from the channel/noise estimator 415 and then outputs the multiplied signal to the subtractor 423. The subtractor 423 subtracts the signal output by the multiplier 417 from the reception signal output by the FFT unit 211.

Consequently, the interference eliminating unit 251 detects a signal in which an interference component is eliminated eliminated from the reception signal and outputs the detected signal to the descrambler 253. That is, the interference eliminating unit 251 eliminates the interference, thereby improving the reception performance of the signal receiver.

When a decoded interference signal is received instead of the hard-decided interference signal, the interference eliminating unit 251 encodes the decoded interference signal using the same encoding scheme as that applied in the signal transmitter, and modulates the encoded interference signal using the same modulation scheme as that applied in the signal transmitter. The modulated interference signal is provided to the subchannelization unit 423.

Next, an operation in which the BS corrects noise power using a power of an interference signal transmitted from a MS of an adjacent cell and computes an Log Likelihood Ratio (LLR) value using the corrected noise power will be described. The channel/noise estimator 411 or 415 receives the interference signal and estimates the average power of the received interference signal. The channel/noise estimator 411 or 415 adds the estimated average power to background noise power and corrects noise power corresponding to a region where interference is not eliminated from the reception signal. The reception signal includes the region where interference is not eliminated and a region where interference is eliminated. At this time, the channel/noise estimator 411 or 415 can correct the background noise power using the following Equation 2, the correction of the noise power is performed for each burst included in the interference signal individually:

$$N'_0 = \begin{cases} N_0 \\ N_0 + \alpha \cdot I_K \end{cases} \quad [\text{Eqn. 2}]$$

In Equation 2, $N'_0$ denotes a corrected noise power value, $N_0$ denotes a background noise power value, $\alpha$ denotes a positive constant, and $I_K$ denotes an average power value of an interference signal estimated on each burst.

In Equation 2, no interference signal exists when $N'_0=N_0$, and an interference signal exists when $N'_0=N_0+\alpha*I_K$. As described above, the channel/noise estimator 411 computes the corrected noise power by adding the average power of the estimated interference signal to the background noise power, such that the noise power for the region where the interference is not eliminated can be distinguished from the noise power for the region where the interference is eliminated. When the value of $\alpha$ is set to 0, the BS does not correct the noise power.

The demodulator 259 computes an LLR value corresponding to a soft decision value of transmitted bits from the desired reception signal using the corrected background noise power. At this time, the demodulator 259 determines reliability for the region where the interference is not eliminated and reliability for the region where the interference is eliminated, and computes a more accurate LLR value using the fact that the reliability for the region where the interference is not eliminated is lower than the reliability for the region where the interference is eliminated. As described above, the demodulator 259 increases a reception success probability by computing an accurate LLR value using the corrected noise power.

Thusly, the signal receiver can apply one of a scheme for eliminating noise using a directly received interference signal from the MS of the adjacent cell and a scheme for computing an LLR value for the desired reception signal using corrected noise power according to whether the noise elimination condition is satisfied.

Now, an operation of the signal receiver will be described with reference to FIG. 5.

Figure 5:
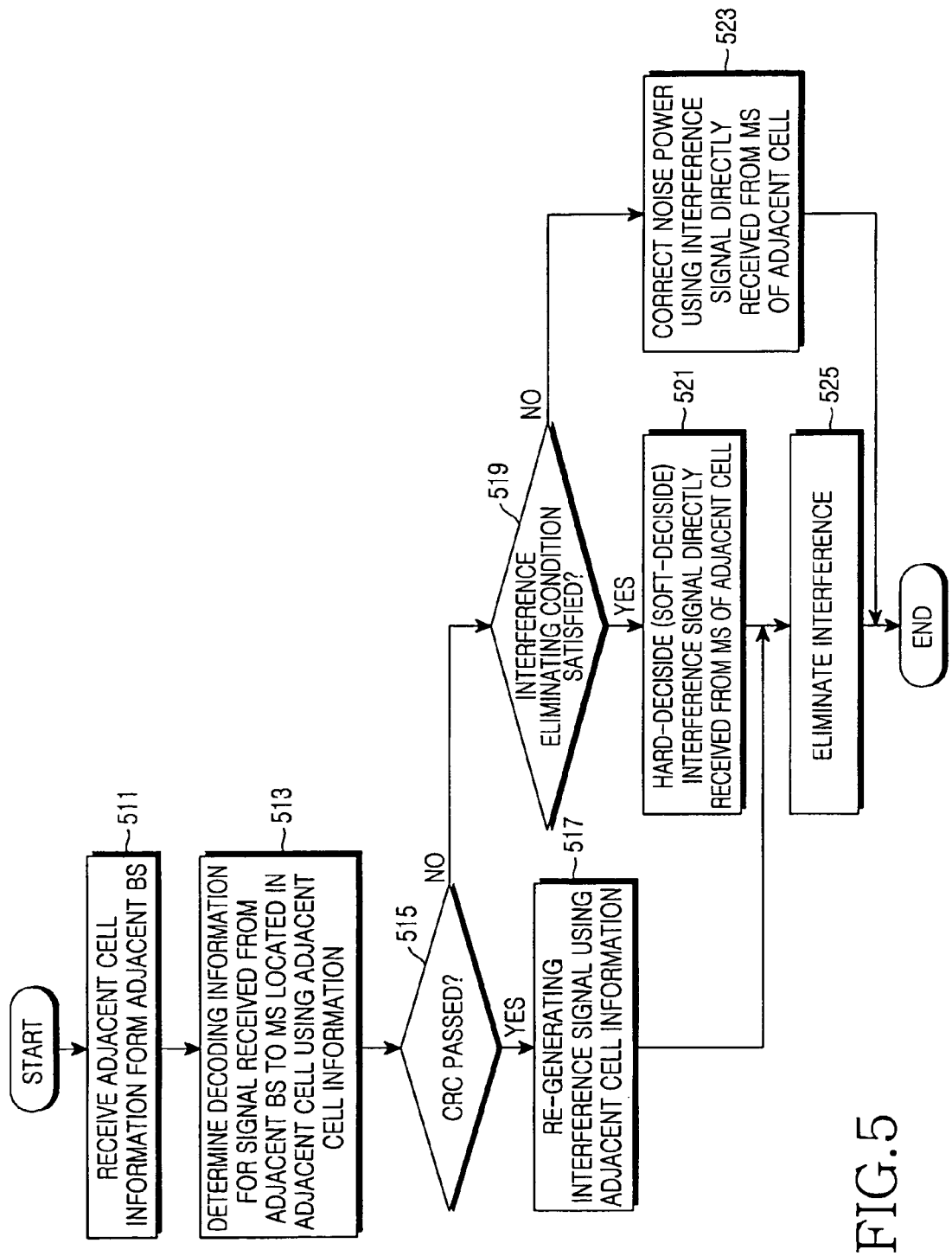
FIG. 5 is a flowchart illustrating an operation of the signal receiver according to an exemplary embodiment of the present invention.

FIG. 5 is a flowchart illustrating an operation of the signal receiver according to an exemplary embodiment of the present invention. The signal receiver, which is included in a serving BS managing the current cell, receives a desired reception signal (hereafter referred to as a "first reception signal") from an MS located in the serving cell, and performs the following steps to eliminate interferences from the first reception signal.

Referring to FIG. 5, the signal receiver receives adjacent cell information from an adjacent BS to manage an adjacent cell. The adjacent cell information includes decoding information, e.g. CRC result, for a signal (hereinafter referred to as a "second reception signal") received at the adjacent BS from the MS located in the adjacent cell. In step 513, the signal receiver detects the decoding information for the second reception signal from the adjacent cell information, and then proceeds to step 515. The adjacent cell information can be delivered through, for example, a backbone network between the adjacent BS that manages the adjacent cell and the serving BS that manages the current cell and is equipped with the signal receiver. As another example, the signal receiver receives the second reception signal delivered from the adjacent BS, directly performs CRC on the second reception signal, and checks the CRC result. In step 515, the signal receiver determines whether the second reception signal has passed a CRC, based on the decoding information for the second reception signal. The CRC is performed for each burst included in the second reception signal.

The signal receiver proceeds to step 517 when the second reception signal has passed the CRC, and proceeds to step 519 when the second reception signal has not passed the CRC. If the second reception signal has passed the CRC, it means that no error has occurred in the second reception signal. If the second reception signal has not passed the CRC, it means that an error has occurred in the second reception signal.

In step 517, the signal receiver re-generates an interference signal using power measured for a signal (hereinafter referred to as a "third reception signal") directly received from the MS located in the adjacent cell, together with the decoding information included in the adjacent cell information, and then proceeds to step 525. Here, the signal receiver measures the power for the third reception signal by referring to the adjacent cell information. As an example, the signal receiver receives only pilot tones in the third reception signal and measures power for the third reception signal by using the pilot tones. In step 525, the signal receiver performs interference elimination on the desired reception signal, i.e. the first reception signal, received from the MS in the serving cell, using the re-generated interference signal. In step 519, the signal receiver decides whether the third reception signal satisfies an interference elimination condition. For example, the interference elimination condition can be set such that a power value of the third reception signal exceeds a power value of the first reception signal as shown in Equation 1. The decision of the interference elimination condition is performed for each burst included in the reception signals. In addition, to measure the power of the third reception signal, the signal receiver can directly receive the third reception signal transmitted from its adjacent MS.

The signal receiver proceeds to step 521 when the interference elimination condition is satisfied, and proceeds to step 523 when the interference elimination condition is not satisfied.

In step 521, the signal receiver performs a hard decision or a soft decision on the third reception signal directly received from the MS located in the adjacent cell and regenerates an interference signal using the hard decision or the soft decision result and then proceeds to step 525. As an example, the signal receiver receives data tones among the third reception signal and uses the data tones to the hard decision or the soft decision.

In step 525, the signal receiver performs interference elimination on the desired reception signal, i.e. the first reception signal, received from the MS in the serving cell, using the re-generated interference signal.

In step 523, the signal receiver corrects a power of background noise corresponding to the desired reception signal using a power of the third reception signal. For example, as shown in Equation 2, the signal receiver adds an average power of the third reception signal to the background noise power corresponding to the desired reception signal, thereby correcting the noise power corresponding to the desired reception signal. Thereafter, the signal receiver can compute an LLR value for each burst included in the desired reception signal, using the power of the corrected background noise. Herein, the power of the background noise is corrected for each burst individually.

Although the present invention has been described in connection with the embodiments that cancel interferences using the reception signal including one burst, the present invention can be applied to a reception signal including N bursts. For example, when the reception signal includes N bursts, the signal receiver can eliminate an interference signal by performing steps 515 to 525 for a k-th burst (where k=1, 2, - - - , N). Here, if the number of bursts is N, it means that the number of interference bursts detected is N.

As is apparent from the foregoing description, the present invention can prevent the degradation of uplink and downlink performance by eliminating an interference signal of an adjacent cell or sector in a communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for canceling interference in a communication system, the method comprising:
   receiving, by a first base station, a first reception signal from a first mobile station located in a cell of the first base station;
   delivering, from a second base station being adjacent to the first base station, information associated with a second reception signal to the first base station, the second reception signal received from a second mobile station located in a cell of the second base station to the second base station;
   determining by the first base station whether an error exists on the second reception signal by performing a cyclic redundancy check (CRC) operation on the second reception signal and examining a CRC result;
   re-generating an interference signal using the decoding information of the second reception signal when no error exists in the second reception signal, and performing interference elimination on the first reception signal using the re-generated interference signal; and
   determining, when an error exists on the second reception signal, whether a power measured for a third reception signal directly received at the first base station from the second mobile station satisfies a predetermined interference elimination condition, the interference elimination condition comprising whether the power of the third reception signal is larger than a sum of a power of background noise and a power of the first reception signal.

2. The method of claim 1, wherein determining whether an error exists on the second reception signal comprises:
   determining whether the error exists on the second reception signal, using a cyclic redundancy check (CRC) result for the second reception signal, provided from the second base station.

3. The method of claim 1, wherein determining whether an error exists on the second reception signal comprises:
   determining whether the error exists on the second reception signal, using the CRC result.

4. The method of claim 1, further comprising:
   performing a decision on the third reception signal directly received at the first base station from the second mobile station, when the interference elimination condition is satisfied; and
   re-generating an interference signal using the decision result for the third reception signal, and performing interference elimination on the first reception signal using the re-generated interference signal.

5. The method of claim 4, wherein the interference elimination condition is satisfied when a value exceeds a predetermined threshold, the value determined by dividing the power of the third reception signal by the sum of the power of background noise and the power of the first reception signal, the threshold being a positive constant determined by a modulation and coding scheme (MCS) level and a number of slots for the third reception signal.

6. The method of claim 4, further comprising:
   correcting a power of background noise used to decode the first reception signal, using the power of the third reception signal, when the third reception signal does not satisfy the interference elimination condition.

7. The method of claim 6, wherein the correcting step comprises:
   correcting the power of the background noise by adding the power of the third reception signal to the power of the background noise.

8. The method of claim 1, wherein the first base station comprises an interference eliminating unit.

9. The method of claim 8, wherein the interference eliminating unit comprises a channel/noise estimator.

10. The method of claim 8, wherein the interference eliminating unit comprises an interference detector.

11. An apparatus for canceling interference in a communication system, the apparatus comprising:
a receiving module configured to receive a first reception signal from a first mobile station located in a cell of a first base station, and receive, from a second base station, information associated with a second reception signal that the second base station being adjacent to the first base station has received from a second mobile station located in a cell of the second base station; and
an interference eliminating unit configured to determine whether an error exists on the second reception signal by performing a cyclic redundancy check (CRC) operation on the second reception signal and examining a CRC result, re-generate an interference signal using the decoding information of the second reception signal when no error exists in the second reception signal, perform interference elimination on the first reception signal using the re-generated interference signal, and determine, when an error exists on the second reception signal, whether a power measured for a third reception signal directly received at the first base station from the second mobile station satisfies a predetermined interference elimination condition, the interference elimination condition comprising whether the power of the third reception signal is larger than a sum of a power of background noise and a power of the first reception signal.

12. The apparatus of claim 11, wherein the interference eliminating unit is configured to determine whether the error exists on the second reception signal, using a cyclic redundancy check (CRC) result for the second reception signal, provided from the second base station.

13. The apparatus of claim 11, wherein the interference eliminating unit is configured to determine whether the error exists in the second reception signal, using the CRC result.

14. The apparatus of claim 11, wherein the interference canceling unit is configured to:
perform a decision on the third reception signal directly received at the first base station from the second mobile station, when the interference elimination condition is satisfied; and
re-generate an interference signal using the decision result for the third reception signal, and perform interference elimination on the first reception signal using the re-generated interference signal.

15. The apparatus of claim 14, wherein the interference elimination condition is satisfied when a value exceeds a predetermined threshold, the value determined by dividing the power of the third reception signal by the sum of the power of background noise and the power of the first reception signal, the threshold being a positive constant determined by a modulation and coding scheme (MCS) level and a number of slots for the third reception signal.

16. The apparatus of claim 14, wherein the interference canceling unit is configured to correct the power of the background noise used to decode the first reception signal, using the power of the third reception signal, when the third reception signal does not satisfy the interference elimination condition.

17. The apparatus of claim 16, wherein the interference eliminating unit is configured to correct the power of the background noise by adding the power of the third reception signal to the power of the background noise.

18. The apparatus of claim 11, wherein the interference eliminating unit transmits a signal to a descrambler.

19. The apparatus of claim 11, wherein the interference eliminating unit comprises a channel/noise estimator.

20. The apparatus of claim 11, wherein the interference eliminating unit comprises an interference detector.

* * * * *